United States Patent [19]

Schuessler

[11] Patent Number: 5,369,260

[45] Date of Patent: Nov. 29, 1994

[54] BAR CODE SCANNING WITH CORRECTION FOR SPOT SPEED VARIATION

[75] Inventor: Frederick Schuessler, Mt. Sinai, N.Y.

[73] Assignee: Symbol Technologies, Inc., Bohemia, N.Y.

[21] Appl. No.: 44,135

[22] Filed: Apr. 8, 1993

[51] Int. Cl.$^5$ .............................................. G06K 7/10
[52] U.S. Cl. ..................................... 235/463; 235/466
[58] Field of Search ................................ 235/463, 466

[56] References Cited

U.S. PATENT DOCUMENTS

| | | | |
|---|---|---|---|
| 4,251,798 | 2/1981 | Swartz et al. | 235/472 |
| 4,276,470 | 6/1981 | Rady et al. | 235/463 |
| 4,578,570 | 3/1986 | Mazumder et al. | 235/466 |
| 4,705,939 | 11/1987 | Ulinski, Sr. | 235/466 |
| 4,761,544 | 8/1988 | Poland . | |
| 5,122,645 | 6/1992 | Saeki et al. | 235/466 |

*Primary Examiner*—Davis L. Willis
*Assistant Examiner*—Peter J. Rashid
*Attorney, Agent, or Firm*—Fish & Richardson

[57] ABSTRACT

Bar code scan data is corrected for spot-speed variation by processing the data to determine a spot-speed profile having non-zero acceleration within at least some of the characters of the bar code symbol being scanned, and then using the speed profile to normalize the scan data. Preferably, average spot speeds across individual characters are determined, and a speed profile is fit to these average spot speed data points in such a manner that the curve is not forced to pass through every data point. In this way, a spot-speed profile is derived that does not incorrectly attribute, to speed variation, errors due to other sources, e.g., random edge errors from printing. Preferably, the spot-speed profile consists of a plurality of straight line segments. The segments may be slightly disjoint, and each segment is from two to four characters in length, depending on the density of the bar code symbol.

24 Claims, 6 Drawing Sheets

BAR CODE SCANNING WITH CORRECTION FOR SPOT SPEED VARIATION

BACKGROUND OF THE INVENTION

This invention relates to bar code scanning.

A bar code symbol is a coded pattern of indicia comprising a series of bars and spaces, called elements, which are typically rectangular and have a variety of possible widths. A specific arrangement of elements defines a character represented according to a set of rules and definitions specified by a symbology. To encode a desired sequence of characters, groups of elements are concatenated to form the complete bar code symbol, with each character being represented by a corresponding group of elements. In some symbologies, start and stop characters are used to indicate where the bar code begins and ends. A number of different bar code symbologies exist, such as UPC/EAN, Code 39, Code 128, Codabar, and Interleaved 2 of 5.

The number of characters per inch represented by the bar code symbol is referred to as the density of the symbol. High density symbols, which have line widths of about 5 mils or less, may be used for small parts such as integrated circuits, or in symbols with high information density. Low density symbols, which have line widths greater than about 50 mil, may be used, for example, for coding packages and containers in warehouses.

In typical scanning systems, a light source, such as a laser or laser diode, produces a beam which is directed by a lens or similar optical components along a light path toward a target that includes a bar code symbol on its surface. The beam produces a spot on the target. In order to scan in a laser system, the spot is mechanically or manually moved to produce a line or series of lines across the symbol. A sensor, such as a photodetector, is positioned in the scanner. A portion of the light which is reflected off the symbol is detected by the sensor which provides an analog signal. The analog signal is converted to a pulse width modulated digital signal, in which the pulse widths correspond to the physical widths of the elements in the time domain, i.e. how long the elements were scanned.

The decoder receives the digital signal and attempts to decode the scan. If start and stop characters and the data characters between them can be decoded successfully, the decoding process is finished. Otherwise, the decoder receives a next scan and attempts to decode it. The process continues until a scan is completely decoded or until no more scans are available. The signal is decoded according to a specific symbology into a binary representation of the data encoded in the symbol.

Scanning systems are available for a variety of applications. A laser scanner may be mounted in a fixed position so that products with a bar code are moved past the scanner mechanically or manually, as in a warehouse or a supermarket. Laser scanners typically have an oscillating motor or other means for causing a laser beam spot to trace a scan line across the bar code. In some other scanner systems, the scanner is hand-held and portable. Some scanners resemble a gun, others are wands which are manually passed over the bar code.

In either fixed or portable systems, the spot speed of the scan line varies as the line is traced across a target. With a hand-held wand, the spot speed varies due to manual motion. Typically, the spot accelerates quickly then slows down. Ideally, a user would start the movement of the wand well in advance of encountering the bar code, but it is not possible to train all users in this procedure and to rely on compliance. For a scanner with an oscillating motor, the motor causes the spot speed to increase and then decrease, thus causing a profile which is generally sinusoidal. Still another cause of spot-speed variation is the orientation of the bar code. If the code is applied to a curved object, the speed of the spot crossing it can vary depending on the degree of curvature.

If a scanning system determines time domain widths of elements, i.e., how long it takes the spot to cross the elements, elements that are spatially equal will produce inconsistent time domain widths if the speed varies. Variation in spot speed may be sufficient to cause a decode failure, which is an inability to decode, or a misdecode, which is an incorrect determination. The error introduced by spot-speed variation combined with other errors, such as printing defects or ambient light, may also cause failure or misdecode, even if the error from spot speed is tolerable.

This variation in spot speed has long been appreciated. The bar codes, themselves, have typically been designed to accommodate the variation in speed. Information is encoded as relative variations in width of the bars and spaces making up the code. During decoding, the relative widths of the elements within a character are used to decode the character. Thus, while speed variation from character to character is not a significant difficulty, speed variation within a character is a problem. Such variation can, if severe, produce an inaccurate decode. E.g., a speed change of 25% from the start to the finish of a character will make bars at the end of the character appear 25% narrower than bars at the start, enough of a difference to affect the decoding.

It has been known that such variation is a source of error in decoding, but a practical solution to the problem has not been available. A difficulty perceived by the art in attempting to solve the problem is that printing errors, and other decoding errors, produce variation in element widths, and there has not heretofore been a practical way of correcting error due to speed changes.

Bar code verifiers (such as the Symbol Technologies LaserCheck II verifier), which are used to measure the quality of printed bar codes, have been designed to subtract out the effect of scan speed variation to give a better measurement of printing quality. Such verifiers compensate for spot-speed variation by fixing the bar code scanner on a stand to hold its location fixed, and placing a calibration bar code in the path of the scan. The calibration bar code has a series of elements with identical width, from which the verifier determines speed variation across the bar code. A bar code to be verified is then placed in the same exact location as the calibration bar code, and the stored speed variation is used to adjust the raw scan data produced.

SUMMARY OF THE INVENTION

In general, the invention features correcting bar code scans for spot-speed variation by processing the scan data to determine a spot-speed profile having non-zero acceleration within at least some of the characters of the bar code symbol being scanned, and using the speed profile to reduce variations in the scan data resulting from spot-speed variations.

In preferred embodiments, average spot speeds across individual characters are determined, and a speed profile is fit to these average spot speed data points in such a manner that the curve is not forced to pass through every data point. In this way, a spot-speed profile is derived that does not incorrectly attribute, to speed variation, errors due to other sources, e.g., random edge errors from printing. Instead, the character-average speed data points are treated as experimental approximations with random errors, and a curve is fit between the data points, rather than through them.

Preferably, the spot-speed profile consists of one or more straight line segments, and most preferably a plurality of such segments. Each straight line segment represents an interval with assumed constant acceleration. One could use a general curve fitting approach to generate the spot-speed profile, but to do so would typically require that the general shape of the curve be known in advance, and this is not always possible. For example, some scanners produce an "M"-shaped spot-speed profile in one direction, but not the other, which may have a simpler sinusoidal shape. If a fifth-order polynomial were used to model the "M"-shaped profile in one direction, it would tend when used in the other direction to produce too close a fit to the data points, resulting in some edge errors and scanner distortions being misinterpreted as spot-speed variation. Furthermore, the processor time required for such polynomial curve fitting is substantial, and could make real time processing more difficult. The segments may be slightly disjoint. Each segment is from two to four characters in length, depending on the density of the bar code symbol being scanned.

To reduce the effect of ink-spread as an error source, segments preferably use edge-to-similar-edge measurements. For continuous codes (e.g., UPC, Code 128, Interleaved 2 of 5), this is assured by making sure each segment starts on a character boundary.

Preferably, the slope determined for a segment is determined by determining a first slope from the segment midpoint to the first character, determining a second slope from the segment midpoint to the last character, and averaging the first and second slopes.

The invention can be applied to verifiers as well as decoders. As applied to verifiers, it allows a verifier to produce approximate bar/space measurements in a purely portable mode (without calibration, and without use of a "training stick" to fix the distance to the bar code symbol).

The invention greatly reduces measurement distortions caused by spot-speed variations in scanning. Scan data is corrected to appear as if it had been scanned with a spot of near constant speed. The process works without prior knowledge of the scanner's spot-speed profile, without knowing the distance from the scanner to the bar code symbol, and without knowledge of the data content of the symbol. The invention can be implemented for real time operation on a wide range of processors (e.g., a reasonably fast 16-bit, integer math CPU). The invention works successfully with poorly-printed bar codes, as well as with test charts. It can correct for spot-speed variations without being misled by the random edge errors caused by poor printing, or by those scanner distortions (such as convolution) that are unrelated to spot-speed variation. And by separately correcting for spot-speed variation, other techniques can be applied, more aggressively, with greater safety, to correcting random edge errors and scanner distortions. E.g., the invention will allow data from forward and reverse scans to be compared, something typical prior art decoders cannot do.

Other features and advantages will be apparent from the following description of preferred embodiments and from the claims.

DESCRIPTION OF THE PREFERRED EMBODIMENTS

Figure 1:
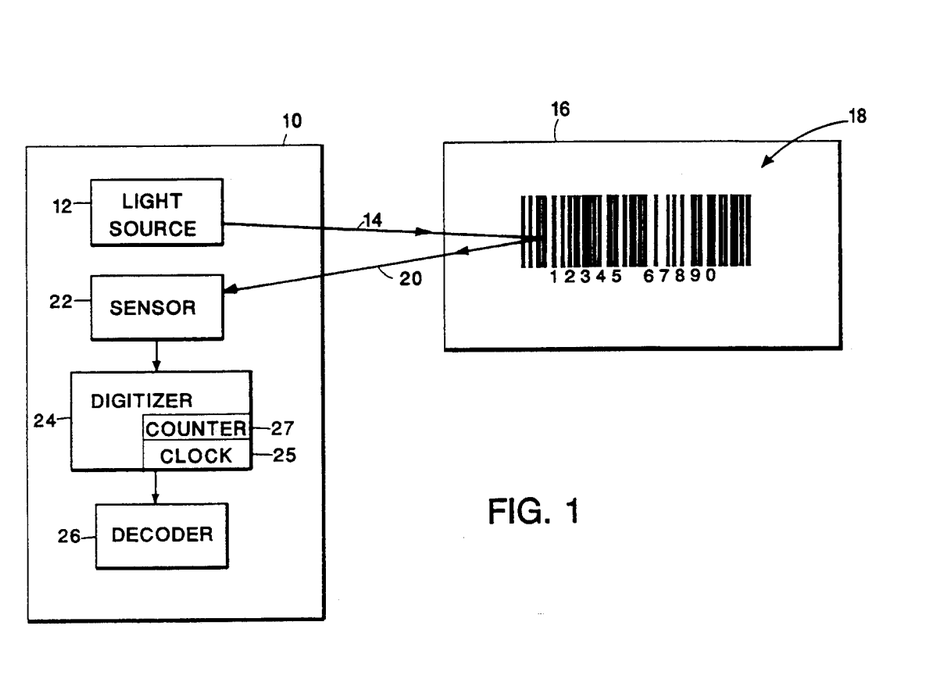
FIG. 1 is a block diagram of a scanning system.
Figure 2:
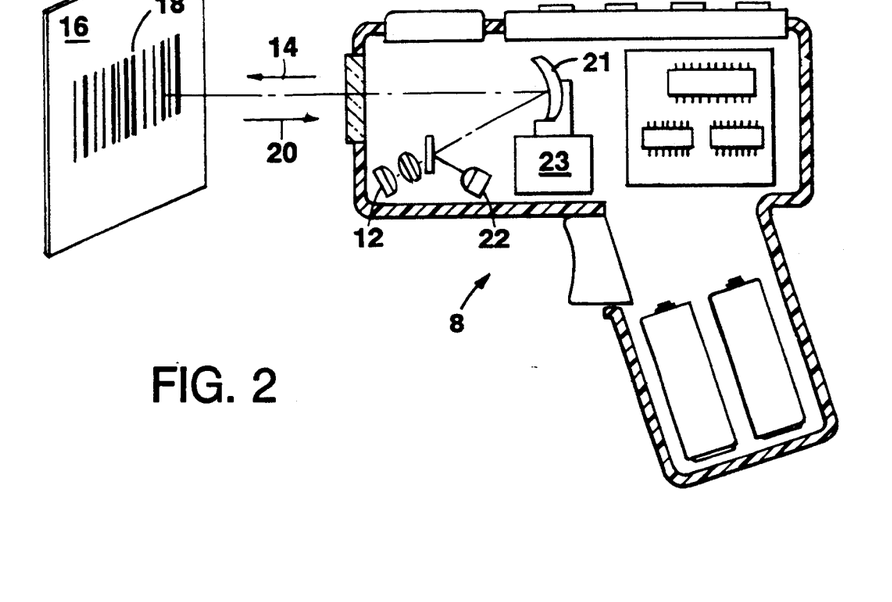
FIG. 2 is a diagrammatic view of a hand-held bar code reader.

Referring to FIGS. 1 and 2, scanning system 10 (portions of which may be incorporated in hand-held bar code reader 8 of FIG. 2) has a light source 12, which directs a beam of light 14 at bar code symbol 18 printed or affixed on target 16. The beam light is moved across the symbol in a scanning pattern by mirror 21 oscillated by motor 23. Symbol 18 produces a reflected beam 20, which is received by sensor 22. The sensor provides an analog signal which indicates how much light is received. The analog signal is converted by digitizer 24 to a digitized signal which is sent to decoder 26. The decoder attempts to convert the digitized signal to a series of alphanumeric characters.

Figure 3A:
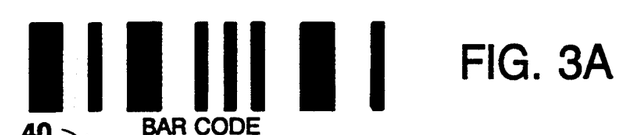
FIGS. 3A-3C show a bar code, and plots of an analog signal and a digitized signal.
Figure 3B:
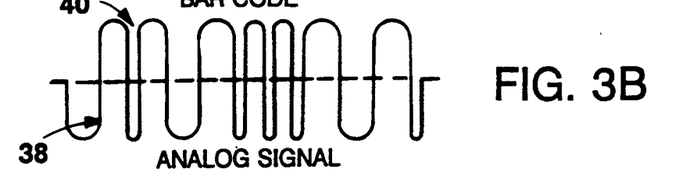
Figure 3C:
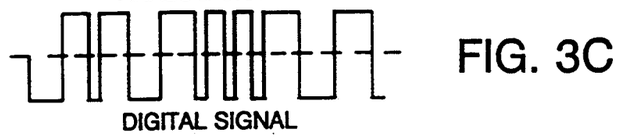

FIG. 3B shows the typical analog signal produced by a sensor when it receives a reflected beam from a bar code symbol (FIG. 3A). The analog signal is digitized (FIG. 3C) by circuitry which detects rising transitions 38 and falling transitions 40 in the analog signal. Counter 27 with clock 25 (FIG. 1) detects these transitions and stores a value equivalent to the number of clock cycles (0.1 microseconds long) between two transitions. In an actual analog signal, the output is distorted with noise and ambient light, the transitions are not necessarily well defined, and printing errors and inconsistencies can cause variation of the signal across a single element.

Figure 4A:
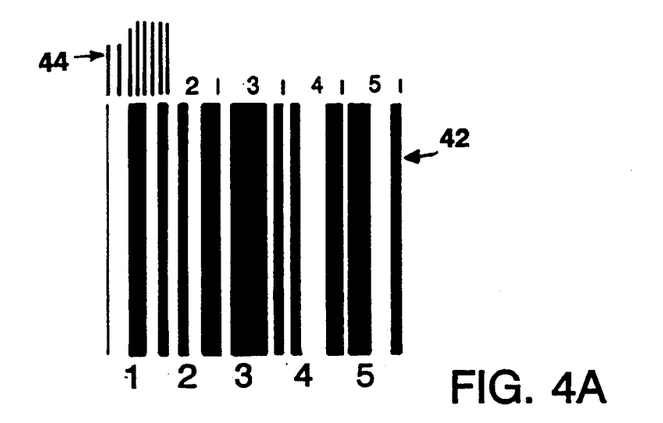
FIGS. 4A-4E show a bar code and plots of clock counts and speed.

Referring to FIG. 4A, bar code symbol 42 includes five characters of the Uniform Product Code (UPC), a symbology used on products in supermarkets. According to the UPC symbology, each data character has two bars and two spaces which have a total width of seven modules 44. A module is a basic unit of width. All the elements in a symbol have a width which is an integral multiple of a module. In the UPC symbology, an element can be between one and four modules wide. In some symbologies, such as Code 39, each element has one of two widths.

Figure 4B:
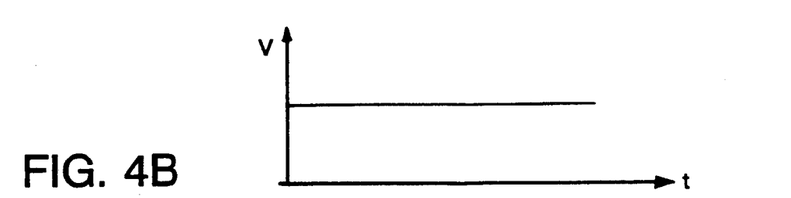
Figure 4C:
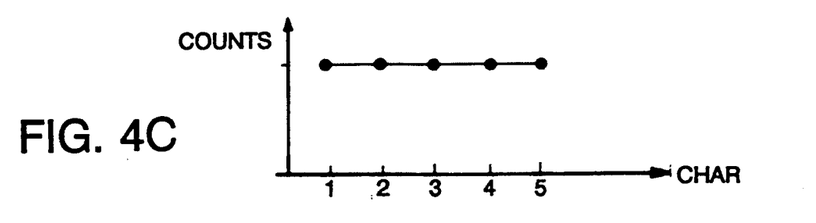

FIG. 4B shows a plot of spot speed versus time for the case of a constant spot speed. This translates into a constant number of clock counts per character, as shown in FIG. 4C, as the width of each character is constant (7 modules).

Figure 4D:
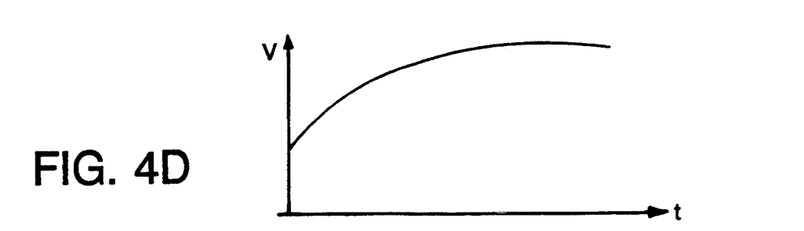
Figure 4E:
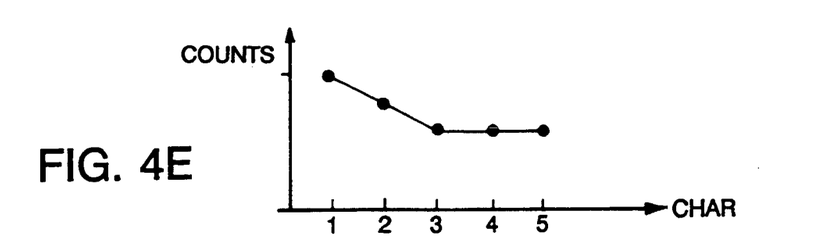

FIGS. 4D and 4E show a more typical case, in which spot speed varies with time, increasing from the first character to the last. The acceleration (slope of speed curve) is positive at the start, but decreases to zero. The acceleration causes the number of counts per character to decrease, even though the width of each character has remained the same. As a result, there may be seventy counts per character (10 counts per module) in the first character and only fifty counts per character (7 counts per module) in the fifth character.

Figure 5A:
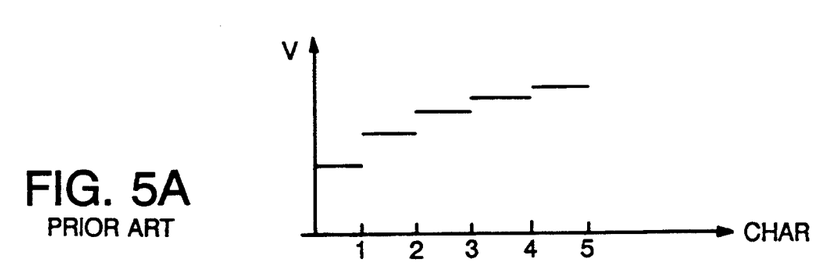
FIGS. 5A-5B show scan spot-speed profiles.

Prior art decoders have attempted to adjust for speed changes from one character to the next, by computing an average speed for each character or, in the case of UPC symbols, an average count per module. FIG. 5A shows the effective speed profile that this prior art technique assumes. Within each character, the speed is assumed constant, and equal to the average speed across the character. This basic form of spot-speed correction is not, however, always sufficient. It will not avoid errors when there is substantial acceleration within characters, and it cannot distinguish between spot-speed variation and other errors, such as printing errors at the edges of characters, or inaccuracies in detecting rising and falling edges.

Figure 5B:
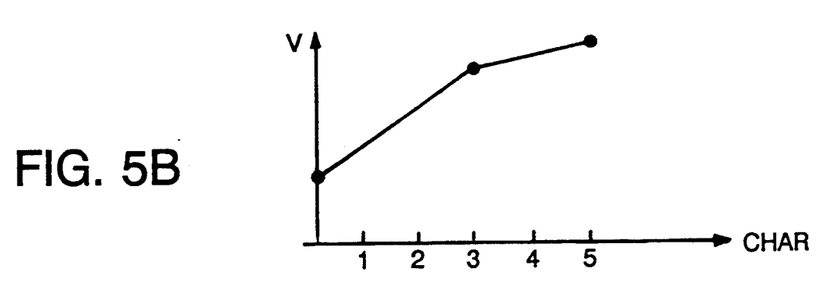

FIG. 5B shows a speed profile used by the invention. Speed is not assumed constant across each character, as in the prior art. Instead the speed profile is characterized by a number of straight line segments, i.e., constant acceleration segments, each of which crosses a number of characters. The number of characters per segment is set depending on the density of the symbol and the number of characters. A low density symbol may only have two characters per segment, whereas a high density symbol should have three or four characters per segment. In FIG. 5B, because there are five characters, one segment crosses three characters and the other crosses two. By extending each straight line segment across a plurality of characters, distortion due to edge effects is reduced, for the error due to one such error is spread out over a greater number of elements.

For a continuous bar code symbology such as UPC (one character follows another without a gap), the segment should begin at the beginning of a character, and end at the end of a character. For a discrete binary symbology such as Code 39, which has a gap between characters, the segment should include a portion of the gap.

Figure 6A:
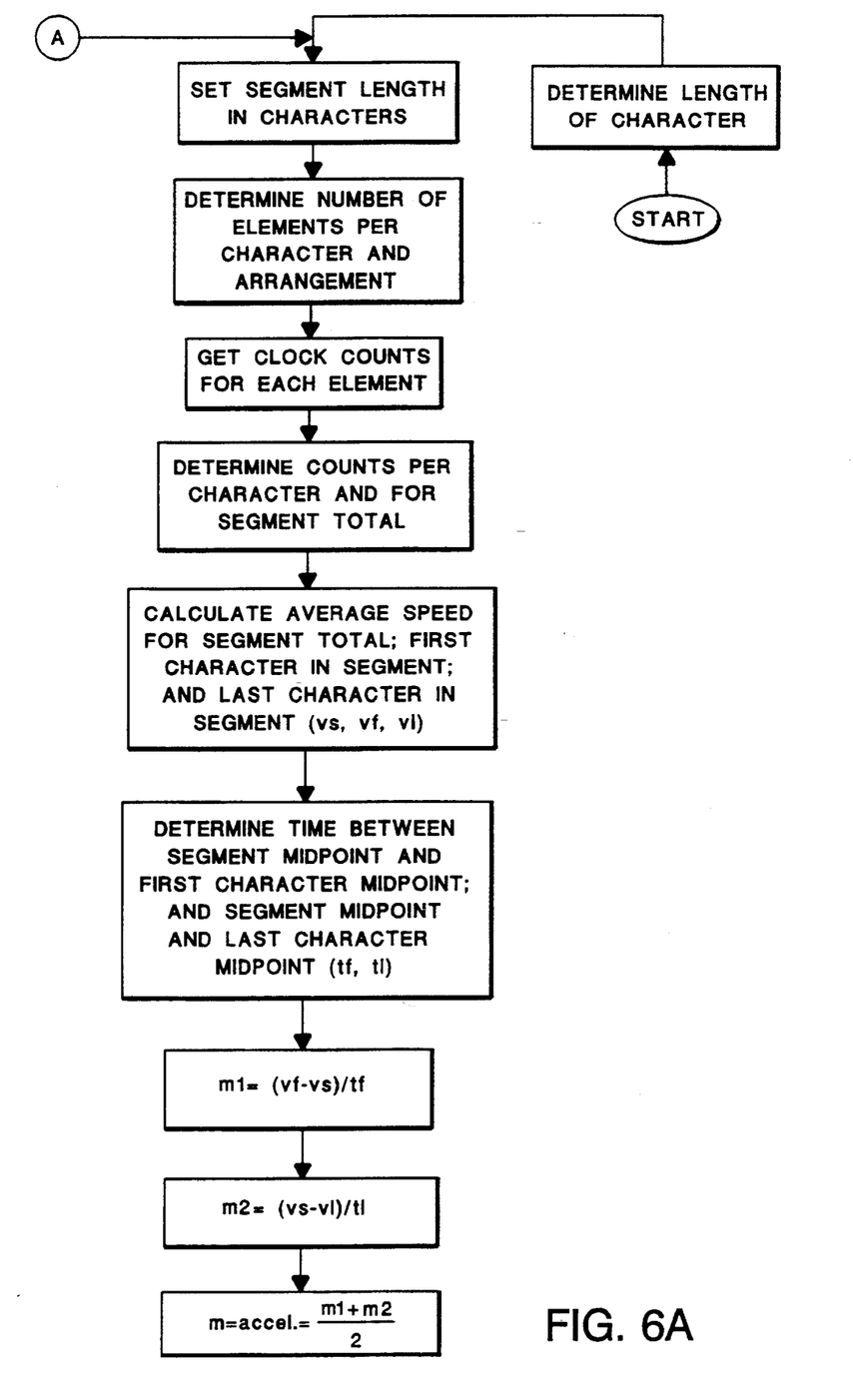
FIGS. 6A and 6B are flow charts of the process used to correct for spot speed variation.

The process used to determine the slopes of the straight line segments in the speed profile is shown in FIG. 6A. First, the length of a character, in terms of the number of elements (bars and spaces) or modules, is determined. This is typically already known from a prior determination of the symbology of the bar code symbol. But if it is not known, a nominal value can be set, and then later adjusted after decoding (and the procedure can be repeated iteratively until the symbology is determined).

Next, there is a determination of the number of characters in a particular segment. As noted earlier, a minimum of two characters is preferred, and a greater number can be used depending on the symbology. In the example of FIGS. 4A-4B, 5A-5B, the first segment has three characters, and the second has two characters. Three characters would have been used for both segments, but for the fact that the entire symbol is only five characters long.

The next step is to set the number of elements in each character, and in the segment as a whole. As each UPC character is known to have four elements (2 bars and 2 spaces), the first segment in the example has twelve elements.

Clock counts are then obtained for each element within the segment, and a determination is made of the number of counts per character and for the segment as a whole. In the example, clock counts are obtained for the first twelve elements.

With this information, average speed is calculated for the total segment ($v_s$), the first character in the segment ($v_f$), and the last character in the segment ($v_1$). The average speed over the segment, $v_s$, is assumed to represent the instantaneous speed at the midpoint of the segment, and the average speed over a character, $v_f$ or $v_1$, is assumed to represent the speed at the midpoint of the character. The scan times, between the segment midpoint and the midpoint of the first character, $t_f$, and between the segment midpoint and midpoint of the last character, $t_1$, are determined from the clock counts. Then, two slopes are determined: a first slope, $m_1$, based on the change in speed between the midpoint of the first character and the midpoint of the segment; and a second slope, $m_2$, based on the change in speed between the segment midpoint and the last character midpoint. The two slopes are averaged to yield the slope, m, to be used for that segment in the speed profile.

Figure 6B:
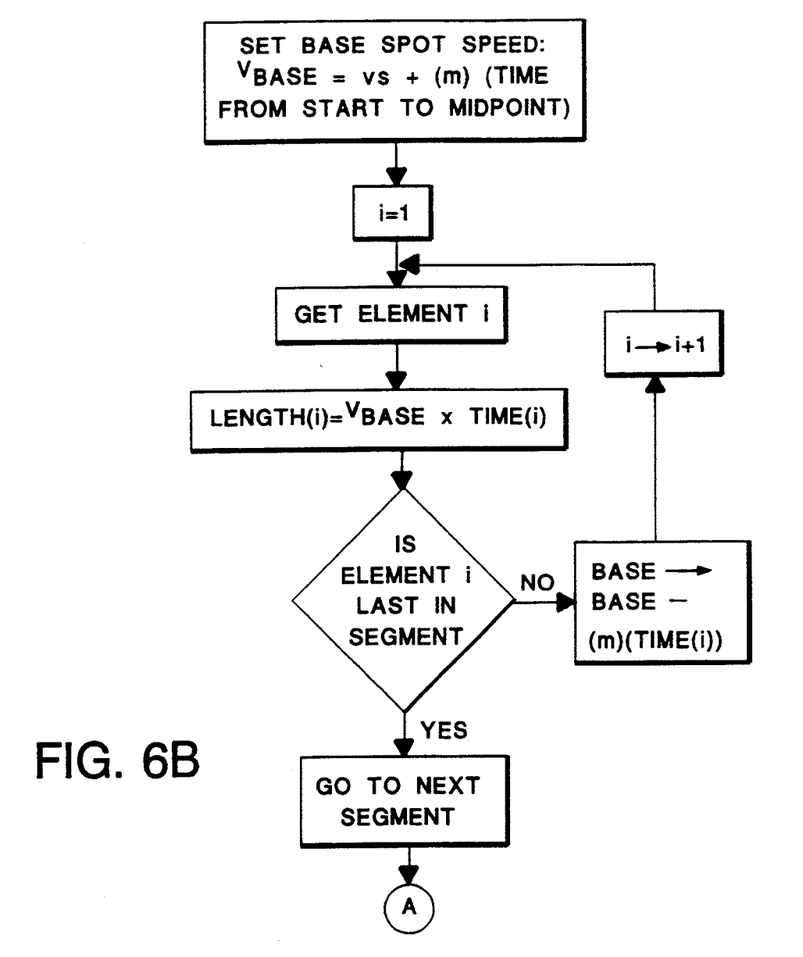

This segment slope, m, which represents the average acceleration through the segment (mils/$\mu$sec/$\mu$sec), is used to normalize the widths of the individual elements. The process is shown in FIG. 6B. First, a base spot speed, $V_{base}$, representing the speed at the end of the segment, is estimated, by subtracting from the average speed of the segment, $v_s$, the product of the average acceleration, m, and the time from the midpoint to the start of the segment. Normalization proceeds through the segment, from the first element to the last. For the first element in the segment, the normalized element length is simply the product of the base spot speed, $V_{base}$, and the time domain width of the element (i.e., the number of clock counts). No correction for acceleration during the element is made (although that could be done). But for the second and subsequent elements, the base spot speed is corrected to account for acceleration. Before proceeding to the next element, the base spot speed is increased (or decreased) by the product of m times the number of $\mu$sec determined for the prior element. This correction is repeated for each subsequent element. After the last element is normalized, the normalization system proceeds to determining the slope, m, of the next segment, and then normalization of that segment. After the last segment is normalized, the scan is decoded.

Other embodiments are within the following claims. For example, speed profiles other than straight line segments could be used. Various curve shapes could be fit to the plot of character counts. Preferably, the curve is not forced to pass through all of the character-count data points, in order to isolate random errors such as from printing.

Normalization also can be applied to bar code verifiers. A verifier, such as a LC2911 LASERCHECK® II portable verifier, produced by Symbol Technologies, Inc., analyzes the quality and readability of bar code symbols, by scanning the symbols to determine printing quality. Using the invention, the effect of speed variations on the measurements of a bar code can be greatly reduced, without the need for calibration with a bar code having a series of elements of fixed width.

Normalization can also be used to check the quality of a scanner by correcting errors introduced by spot-speed variation. By reducing the effect of spot-speed variation on the results, one can more readily and accurately test the pitch, yaw, tilt, and other parameters of the scanner.

What is claimed is:

1. A method for decoding the output of a bar code scanner of the type used for scanning bar code symbols which have a plurality of characters, each of which comprises a plurality of elements, the output of the scanner representing the time variation of light reflected from a spot moving across the elements of the bar code symbol at a varying speed, said method comprising the steps of:

receiving a signal comprising a series of values each of which represents the time required for the spot to cross an element in the bar code symbol;

processing said series of values to determine a spot-speed profile for at least a portion of said symbol, said profile having non-zero acceleration within at least some of the characters; and adjusting said series of values to lessen the effect of variation in spot speed.

2. The method of claim 1 further comprising the step of decoding said bar code symbol using said series of adjusted values.

3. The method of claim 1 further comprising the step of determining the symbology of the bar code symbol prior to determining said spot-speed profile.

4. The method of claim 1 wherein said processing step comprises determining a character-average spot speed for each of a plurality of characters, and choosing said spot-speed profile based on said character-average spot speeds.

5. The method of claim 4 wherein said spot-speed profile is determined by fitting a curve to the set of character-average spot speeds without requiring the curve to pass through the character-average spot speeds, to avoid misinterpreting as spot-speed variation those random errors resulting from sources other than spot speed variation.

6. The method of claim 5 wherein said speed profile is a plurality of straight line segments.

7. The method of claim 6 wherein each of said line segments crosses a plurality of characters.

8. The method of claim 7 wherein each of said line segments crosses from two to four characters.

9. The method of claim 7 wherein said segments are taken from edge to similar edge.

10. The method of claim 7 wherein each said segment crosses a first character and a last character, and wherein the slope determined for a segment is determined by determining a first slope from the segment midpoint to the first character, determining a second slope from the segment midpoint to the last character, and averaging said first and second slopes.

11. Apparatus for decoding the output of a bar code scanner of the type used for scanning bar code symbols which have a plurality of characters, each of which comprises a plurality of elements, the output of the scanner representing the time variation of light reflected from a spot moving across the elements of the bar code symbol at a varying speed, said apparatus comprising:

means for receiving a signal comprising a series of values each of which represents the time required for the spot to cross an element in the bar code symbol;

means for processing said series of values to determine a spot-speed profile for at least a portion of said symbol, said profile having non-zero acceleration within at least some of the characters; and means for adjusting said series of values to lessen the effect of variation in spot speed.

12. The apparatus of claim 11 further comprising a decoder for decoding said bar code symbol using said series of adjusted values.

13. The apparatus of claim 11 further comprising means for determining the symbology of the bar code symbol prior to determining said spot-speed profile.

14. The apparatus of claim 11 wherein said processing means comprises determining a character-average spot speed for each of a plurality of characters, and choosing said spot-speed profile based on said character-average spot speeds.

15. The apparatus of claim 14 wherein said spot-speed profile is determined by fitting a curve to the set of character-average spot speeds without requiring the curve to pass through the character-average spot speeds, to avoid misinterpreting as spot-speed variation those random errors resulting from sources other than spot speed variation.

16. The apparatus of claim 15 wherein said speed profile is a plurality of straight line segments.

17. The apparatus of claim 16 wherein each of said line segments crosses a plurality of characters.

18. The apparatus of claim 17 wherein each of said line segments crosses from two to four characters.

19. The apparatus of claim 17 wherein said segments are taken from edge to similar edge.

20. The apparatus of claim 17 wherein each said segment crosses a first character and a last character, and wherein the slope determined for a segment is determined by determining a first slope from the segment midpoint to the first character, determining a second slope from the segment midpoint to the last character, and averaging said first and second slopes.

21. The apparatus of claim 11 or 17 further comprising:

a light source for directing a beam of light at a bar code symbol, said beam of light producing said spot, said beam causing a reflected beam of light;

a sensor for detecting said reflected beam and for providing an analog signal representing the detected light; and a digitizer for converting the analog signal to a digital signal and for producing said series of values.

22. The apparatus of claim 21 wherein said light source and said sensor are housed in a hand-held housing.

23. The apparatus of claim 22 wherein said light source is a laser.

24. The apparatus of claim 23 further comprising an oscillating motor for moving said spot.

* * * * *